F.C. Doran and B.F. Sortman.
Water Wheel.
117,522 PATENTED AUG 1 1871
Fig 1.
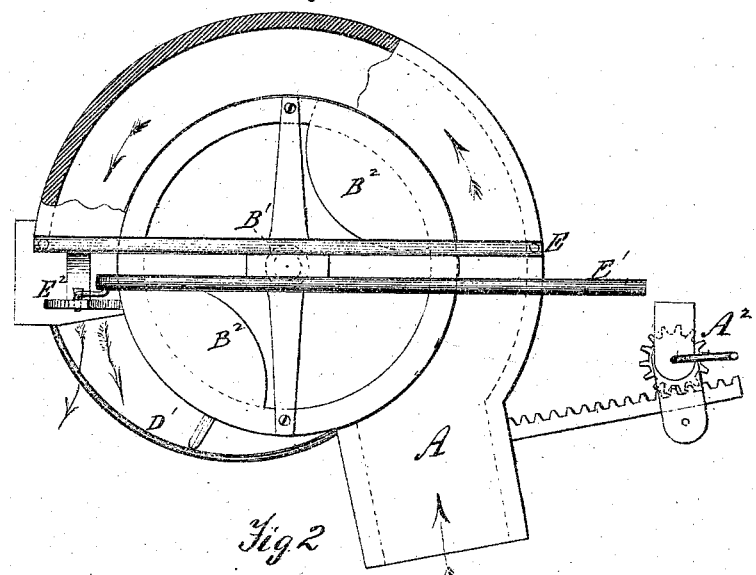
Fig 2.
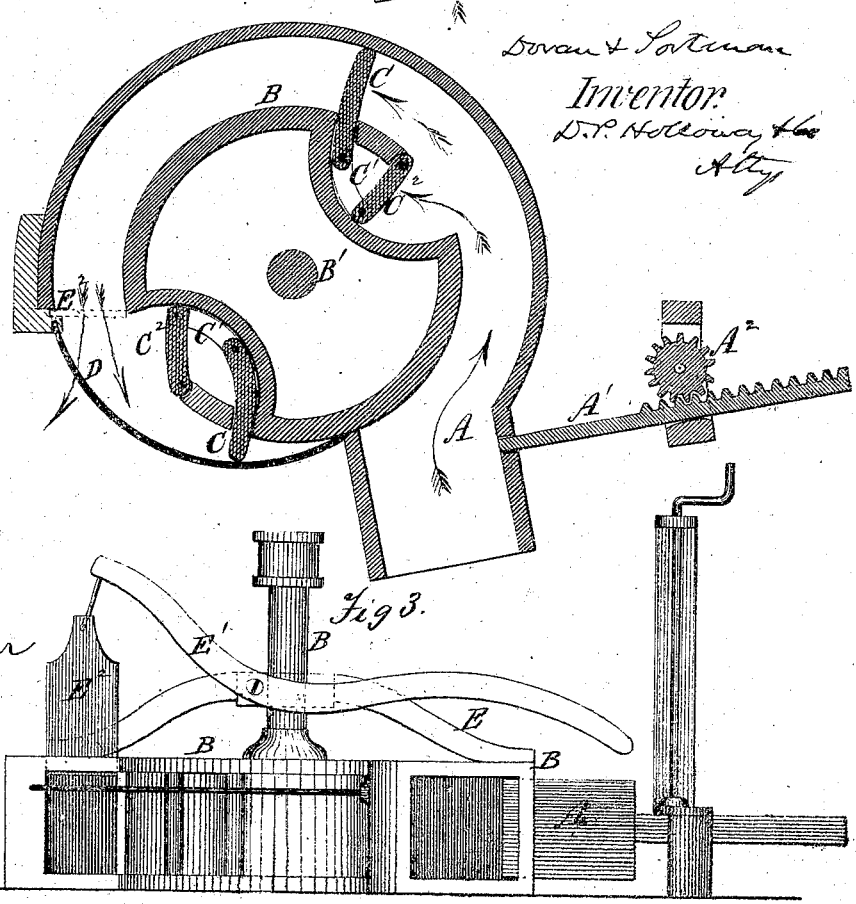
Doran & Sortman
Inventor.
D.P. Holloway &c
Atty
Witnesses.
A. Ruppert
C.F. Clausen
Fig 3.

UNITED STATES PATENT OFFICE.

FRANK C. DORAN AND BENJAMIN F. SORTMAN, OF KNIGHTSTOWN, INDIANA.

IMPROVEMENT IN WATER-WHEELS.

Specification forming part of Letters Patent No. 117,522, dated August 1, 1871.

*To all whom it may concern:*

Be it known that we, FRANK C. DORAN and BENJAMIN F. SORTMAN, of Knightstown, in the county of Henry and State of Indiana, have invented certain Improvements in Water-Wheels; and we do hereby declare that the following is a full, clear, and exact description thereof, reference being had to the annexed drawing making a part of this specification, in which—

Figure 1 is a plan or top view of our improved water-wheel, with a portion of the top covering of the water-trunk or chute broken away, the position of the wheel being shown, and also the gates for controlling the flow of the water. Fig. 2 is a horizontal section on line $x$ $x$ of Fig. 3, showing the water-trunk or chute, the construction of the wheel, the hinged buckets, and the means of connecting them to the rim of the wheel, and also the guide-rod for returning the buckets to their closed position before entering the trunk. Fig. 3 is a side elevation, showing the arrangement of the various parts with reference to each other.

Corresponding letters refer to corresponding parts in the several figures.

This invention relates to what we term a direct-acting water-wheel; and it consists in the construction, combination, and arrangement of certain of its parts, as will be more fully explained hereinafter.

In constructing wheels of this character we erect a suitable platform or foundation upon which to place the water-trunk or chute A, which is straight where the water enters, and is adapted to receive the sliding gate $A^1$, which has upon its outer end a toothed rack, into which a pinion, $A^2$, meshes, it being arranged upon a shaft which extends to any convenient place, to be operated by the attendant by means of a crank or wheel placed upon its end. The straight portion of the water-trunk or chute is long or short, as may be required by the circumstances of each case; but in any case it should be so arranged with reference to the wheel that, as the water enters, it shall strike the wheel tangentially, and pass into the reduced and curved portion of the said trunk, which portion is in the form of a semicircle, or of a segment of a circle, and keeps the water in close contact with the rim of the wheel, and with its buckets for one-half of its diameter. It may, however, be extended so as to extend more than half-way around the wheel, or it may stop short of one-half and produce good results. The amount of water admitted to the wheel can at all times be regulated by the gate or slide $A^1$. The wheel is constructed as shown in Fig. 2, it being composed of a cylinder of the proper breadth and diameter, and having formed in its periphery two or more semicircular chambers or recesses for the reception of the hinged buckets C to play in, and it is also supplied with arms and a hub, by which it is attached to the shaft $B^1$. Upon one end of each of the segmental arches which form the chambers or recesses $B^2$ $B^2$ the rim of the wheel projects far enough to admit of there being formed a slot through which the curved buckets C move or slide, they being formed as shown in Fig. 2, and pivoted to curved connecting-links $C^1$, which links have their opposite ends pivoted to other links, $C^2$, their opposite ends being pivoted to the rim of the wheel. The buckets C and the links $C^1$ are formed with their outer surfaces upon a circle or segment of a circle corresponding in its radius with that of the inner surface of the chamber or recess in which they work, they being so arranged that, as they enter the water-trunk, the water will strike against the outer surface of the portion $C^2$, and thus, through its pressure upon such portion, act upon the link $C^1$, and upon the bucket C, and force it out into contact with the inner surface of the water-trunk, where it will remain until it has passed through said trunk, when the outer surface of the bucket will come in contact with the curved guide D, the construction of which is such as to return the bucket to its position within the chamber previous to its again entering the water-trunk, and will bring the portion $C^2$ into a position to form a portion of the rim of the wheel. Any desired number of these buckets may be placed in a wheel, such number depending upon the diameter of the wheel. The curved guide D, above referred to, may consist of a rod or bar of iron, or it may be made of cast metal or of wood, and be deep enough to bear upon the whole or any desired portion of the end of the bucket. For the purpose of holding the shaft and wheel in position, a bar or an arch, E, is attached to the upper surface of the case, it rising above the wheel far enough to receive and hold the box in which the shaft of the wheel rotates. To this arch there may be pivoted a lever, $E^1$, the short arm of which extends outward into a position to be attached, by means of a suitable connecting-rod, with a valve or gate, $E^2$, which is placed in or near the discharge end of the water-trunk or chute, its purpose being to enable the operator in starting the wheel to close the same, and thus cause a pressure within the trunk or chute which shall force out the buckets which may be within such trunk, if they are not already in position. The gates or valves $A^1$ and $E^2$ may be operated by the means shown, or any other suitable devices may be employed for that purpose.

What we claim as our invention, and desire to secure by Letters Patent, is—

1. The water-wheel B, consisting of the parts B, C, $C^1$, and $C^2$, all being constructed and arranged substantially as and for the purpose set forth.

2. The combination of the gates or valves $A^1$ and $E^2$, they being arranged with reference to each other and to the wheel, substantially as and for the purpose set forth.

3. The combination and arrangement of the trunk or chute A, the wheel B, and the guide D, substantially as and for the purpose set forth.

In testimony whereof we have signed our names to this specification in the presence of two subscribing witnesses.

F. C. DORAN.
B. F. SORTMAN.

Witnesses:
A. H. FLANNER,
A. M. EDWARDS.